United States Patent
Caccialupi et al.

(10) Patent No.: US 12,104,739 B1
(45) Date of Patent: Oct. 1, 2024

(54) THREAD PROTECTOR ASSEMBLY FOR THREADS OF A TUBULAR

(71) Applicant: UNIARMOUR LLC, Houston, TX (US)

(72) Inventors: Alessandro Caccialupi, Houston, TX (US); Hazem Abdel Halim, Houston, TX (US)

( * ) Notice: Subject to any disclaimer, the term of this patent is extended or adjusted under 35 U.S.C. 154(b) by 42 days.

(21) Appl. No.: 18/046,264

(22) Filed: Oct. 13, 2022

Related U.S. Application Data

(60) Provisional application No. 63/255,087, filed on Oct. 13, 2021.

(51) Int. Cl.
  *F16L 57/00* (2006.01)
  *F16L 15/00* (2006.01)

(52) U.S. Cl.
  CPC .......... *F16L 57/005* (2013.01); *F16L 15/007* (2013.01)

(58) Field of Classification Search
  CPC ...... B65D 59/00; F16L 15/007; F16L 15/002; F16L 15/08; F16L 57/005; F16L 57/00; F16L 58/182; F16L 2201/80; F16L 2201/20
  See application file for complete search history.

(56) References Cited

U.S. PATENT DOCUMENTS

| | | |
|---|---|---|
| 5,524,672 A | 6/1996 | Mosing |
| 6,332,478 B1 | 12/2001 | Holden |
| 6,568,430 B1 | 5/2003 | Shafer |
| 6,935,380 B2 | 8/2005 | Rahimzadeh |
| 2010/0037977 A1 | 2/2010 | Rahimzadeh |
| 2021/0239254 A1* | 8/2021 | Kroll ...................... B65D 59/00 |

* cited by examiner

*Primary Examiner* — Aaron M Dunwoody
(74) *Attorney, Agent, or Firm* — Egbert, McDaniel & Swartz, PLLC

(57) ABSTRACT

A thread protector assembly has an outer sleeve and a cap having a portion positioned interior of the outer sleeve. The portion of the cap is adapted to engage with a threaded surface of a tubular. The cap has an end exposed outwardly of the outer surface. The outer sleeve is freely rotatable or swivelable relative to the cap. The outer sleeve is in snap-fit relationship with said cap. The outer sleeve has an upset at one end thereof that overlies the outer diameter of the shoulder of the tubular.

17 Claims, 2 Drawing Sheets

THREAD PROTECTOR ASSEMBLY FOR THREADS OF A TUBULAR

CROSS-REFERENCE TO RELATED APPLICATIONS

The present application claims priority from U.S. Provisional Patent Application Ser. No. 63/255,087, filed Oct. 13, 2021, and entitled "Swivel Thread Protector".

BACKGROUND OF THE INVENTION

1. Field of the Invention

The present invention relates to thread protectors for the threads of pipes. More particularly, the present invention relates to a thread protector which has a swivelable or rotatable portion.

2. Description of Related Art Including Information Disclosed Under 37 CFR 1.97 and 37 CFR 1.98

Pipes, such as pipes used for oil and gas drilling and production, are often produced in sections and are axially connected end-to-end. Typically, the connection involves the use of a male, externally threaded portion at one end of the pipe section that is threadedly engageable with a mating female, internally threaded portion at an end of an axially adjacent pipe section. The male, externally threaded end of the pipe is often referred to as the "pin end". The female, internally threaded end of the pipe is referred to as the "box end".

The ends of the pipe, including the threads, are subject to damage when not in use. This damage can be in the nature of corrosion, impacts with other objects, or as a result of being dropped during transportation or storage. Such damage can render the pipe faulty or unusable. It can also result in delay, hardship and unnecessary expense. Devices known as thread protectors are commonly used to protect the ends of pipes and serve to protect the internal or external threads on the ends of the pipe from such damage. A pin end thread protector is connected to and protects the pin end of the pipe and associated external threads. A box end thread protector is connected to and protects the box end of the pipe and associated internal threads. The thread protectors are designed to prevent damage to the respective pipe ends when the pipe impacts other objects, the ground, or receives external impacts. In addition, the thread protectors are designed to seal the ends of the pipe to reduce the potential for premature corrosion of the pipe and the threads associated therewith.

In order to protect the pin end and the box end of the pipe section, conventional thread protectors will usually come in two types. One of the types is a pin end thread protector that is disposed about the pin end of the pipe and includes internal threads that engage the external threads on the pin end. A box end thread protector is positioned in the box end of the pipe and includes an external thread that engages the internal threads on the box end. The pin end thread protector is sized, configured and designed such that its internal threads mate with the external threads of the pin end. The box end thread protector is sized, configured and designed such that its external threads mate with the internal threads of the box end. In other words, the internal threads of the pin end protector fit between the external threads of the pin end as the pin end protector is threaded onto the pin end. The external threads of the box end protector fit between the internal threads of the box end as the box end protector is threaded onto the box end.

Conventional thread protectors need to be properly torqued to the pipe in order to avoid dislodging from the pipe. If a thread protector loses the torque, vibration (as a result of transport), could completely loosen such thread protectors and expose the pipe ends to the elements and potential damage. Thread protectors can lose torque when several protectors hit against each other or when pipes roll into each other. This provides a reaction torque to the protectors. These thread protectors will typically have a larger outer diameter than the pipes.

FIG. 1 shows a pair of standard thread protectors 10 as used in the prior art. FIG. 1 shows a thread protector 12 for the box end of the pipe. Thread protector 14 is for the pin end of the pipe. The thread protector 12 for the box end of the pipe includes an external thread 16 and an end 18 which extends outwardly of the pipe. The end 18 typically has a means for affixing or securing the thread protector 12 onto the box end of the pipe.

FIG. 1 also shows the thread protector 14 for the pin end of the pipe. The thread protector 14 has an internal thread 20 will receive the pin end of the pipe. End 22 of the thread protector 14 extends outwardly from the pin end of the pipe. This end 22 also has a means for affixing the thread protector 14 to the pipe. The outermost surfaces of the thread protectors can hit other outer surface. This contact could ultimately loosen such thread protectors.

Various patents have issued and been applied for in the past relating to end caps or thread protectors for pipes. For example, U.S. Patent Publication No. 2010/0037977, published on Feb. 18, 2010 to Rahimzadeh et al., describes a universal pipe cap. The universal pipe cap includes a fluid impervious base and an adjustable sleeve extending from the base and configured to couple to a plurality of pipe ends that vary in size. A securement mechanism selectively sealingly engages the adjustable sleeve to one of a plurality of pipe ends so that the adjustable sleeve and the fluid impervious base are able to cooperate with one another to cap the pipe end. The adjustable sleeve is made from a flexible material and may attach to pipe ends that are either larger in diameter or smaller in diameter than the inside diameter of the adjustable sleeve.

U.S. Pat. No. 6,935,380, also to Rahimzadeh et al. describes a reversible dual size plumbing end cap. The plumbing end cap has either a first outer diameter or a second outer diameter that includes a fluid impervious base for overlying the end of the selected pipe. The end cap also includes a wall fixed to a perimeter of the base and configured to seal the end of the selected pipe. The wall is pivotable between a first configuration to fit the first outer diameter and a second configuration to fit the second outer diameter.

U.S. Pat. No. 6,568,430, issued on May 27, 2003 to Shafer, describes a quick release pipe band. The quick release mechanism has a band with slots thereon which is enclosed by a latching mechanism. Cams on the end of a locking lever engage with slots in the band and tighten the band about the cap. The pipe end cap of the Shafer patent is intended for use in closing one end of the pipe for transporting materials to job sites using a large pipe as a storage container.

U.S. Pat. No. 6,332,478, issued on Dec. 25, 2001 to Holden et al., describes a reusable pipe flange cover. The molded, flexible pipe flange cover for temporarily covering a pipe flange and a pipe opening includes a substantially round center portion having a peripheral skirt portion depending from the center portion. The center portion is adapted to engage a front side of the pipe flange and to seal the pipe opening. The peripheral skirt portion is formed to include a plurality of circumferentially spaced tabs, wherein free ends of the flexible tabs are formed with respective through passages adapted to receive a drawstring for pulling the tabs together on a back side of the pipe flange.

U.S. Pat. No. 5,524,672, issued on Jun. 11, 1996 to Mosing et al., describes a casing thread protector. The thread protector has a toroidal body of an elastomer with a bore to accept a pipe end and a metal band and clamp arrangement extending around its periphery. The body is cut through one side to allow the body to expand peripherally. The bore accepts the end of a pipe with threads to be protected when the periphery is expanded and grips the pipe with the bore when the clamp closes the cut and shrinks the bore. To increase unit loading to force more elastomer of the body into thread grooves, the bore has projections for gripping pads. The pads, which may be replaceably attached, increase deformity under clamping pressure and increase the force required to dislodge the protector from the threads. The metal band is removable from an open peripheral groove or an optional arcuate tunnel partially encircling the pad body.

It is an object of the present invention to provide a thread protector which prevents side torque from unscrewing the protector from the pipe.

It is another object of the present invention provide a thread protector assembly which reduces the chances of dislodging from the pipe.

It is another object the present invention to provide a thread protector assembly that will protect the integrity of the tubular connection of the pipe.

It is another object of the present invention to provide a thread protector assembly that avoids the application of torque to the tubular.

It is still further object the present invention to provide a thread protector assembly which is relatively easy to unscrew from the threads of the tubular.

It is a further object of the present invention to provide a thread protector assembly that effectively protects the threads of a tubular from damage as a result of impacts.

These and other objects and advantages of the present invention will become apparent from a reading of the attached specification and appended claims.

BRIEF SUMMARY OF THE INVENTION

The present invention is a thread protector assembly that comprises an outer sleeve and a cap having a portion positioned interior of the outer sleeve. This portion of the cap is adapted to engage with a threaded surface of a tubular. The cap has an end exposed outwardly of the outer sleeve. The outer sleeve is freely rotatable or swivelable with respect to the cap.

In particular, the outer sleeve has a wide diameter portion that has a diameter greater than a diameter of a remainder of the outer sleeve. This wide diameter portion of the outer sleeve is, in particular, an upset formed at one end of the outer sleeve. The outer sleeve has no surface directly engaged with the threaded surface of the tubular.

The end of the cap has a shoulder. The shoulder has an outer diameter greater than an outer diameter of the outer sleeve. The end of the cap has a slot formed therein. The slot is adapted to allow a tool to be received therein for rotation of the cap with respect to the tubular. In an embodiment of the present invention, the portion of the cap has internal threads formed therein. The internal threads are adapted to engage with the threads of the tubular.

The present invention has also a thread protector assembly. This thread protector assembly includes a tubular having threads at one end thereof. The tubular has a shoulder formed away from this one end. The cap and the outer sleeve are installed together in snap-fit relation. The cap and the outer sleeve are then positioned over the threads of the tubular by screwing the cap onto the threads of the tubular. The cap has an end extending outwardly beyond the end of the tubular. The cap retains the outer sleeve such the outer sleeve is freely rotatable relative to the tubular.

The end of the cap as a shoulder. The outer sleeve is retained between the shoulder of the tubular and the shoulder at the end of the cap. The sleeve and the cap are joined together axially and can rotate and swivel relative to each other. The outer sleeve has a wide diameter portion that has a diameter greater than a diameter of a remainder of the outer sleeve. This wide diameter portion of the outer sleeve is an upset and is formed at one end of the outer sleeve. The upset of the outer sleeve overlies an outermost portion of the shoulder of the tubular. The upset has an outer diameter greater than an outer diameter of a widest diameter of the tubular.

The outer sleeve has no surface directly engaged with the threads of the tubular. The end of the cap has a shoulder. The shoulder has an outer diameter greater than an outer diameter of the outer sleeve. The outer sleeve has an end retained by the shoulder. The end of the cap has a slot formed therein. The slot is adapted to allow a tool to be received therein for rotation of the cap with respect to the tubular. The portion of the cap has internal threads formed therein. The internal threads are adapted to engage with the external threads of the tubular.

The present invention is a thread protector assembly that has an outer sleeve and an inner cap. The outer sleeve is designed to freely spin or swivel when a side load is imparted. This avoids any transfer of torque to the threaded cap. The sleeve is also designed to protect the tubular connection.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 2:
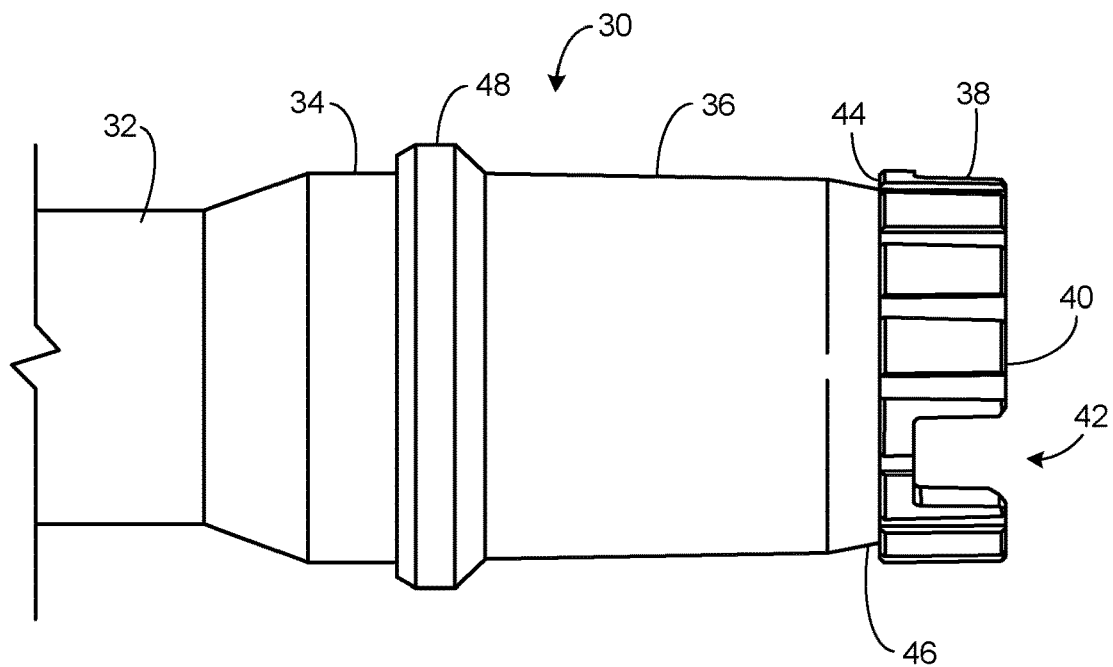
FIG. 2 shows a side elevational view of the thread protector assembly of the preferred embodiment of the present invention.

Referring to FIG. 2, there is shown the thread protector assembly 30 in accordance with the preferred embodiment of the present invention. This thread protector assembly 30 includes a tubular 32 that has threads at one end thereof. Tubular 32 has an upset 34 formed adjacent an end of the tubular 32. The upset 34 will have a shoulder (not shown in FIG. 2). An outer sleeve 36 is positioned over the threads of the tubular 32. A cap 38 has a portion that is engaged with the threads of the tubular (not shown in FIG. 2). The cap 38 has an end 40 that extends outwardly beyond the end of the tubular. Cap 38 retains the outer sleeve 36 such that the outer sleeve 36 is freely rotatable relative to the tubular 32.

In FIG. 2, it can be seen that the end 40 of the cap 38 has a slot 42 formed therein. Slot 42 is adapted to allow a tool to be received therein. In particular, the slot 42 allows a tool to be received so as to provide the rotation of the cap 38 with respect to the threads of the tubular.

The cap 38 also has a shoulder 44. The shoulder 44 has an outer diameter greater than an outer diameter at the end 46 of the outer sleeve 36. The outer sleeve 36 is snap-fit onto the outer surface of cap 38 (as will be described hereafter).

Outer sleeve 36 also has a wide diameter portion 48 that has a diameter greater than a diameter of a remainder of the outer sleeve 36. This wide diameter portion 48 is an upset formed at one end of the outer sleeve 36. Upset 48 will overlie the portion of the upset 34 of the tubular 32. In particular, this upset 48 of the outer sleeve 36 will overlie the outermost portion of the shoulder of the tubular 32. In particular, the upset 48 of the outer sleeve 36 will have an outer diameter greater than an outer diameter of a widest diameter of the tubular 32. As such, this configuration will avoid the occurrence of any damaging contact between external objects and the threads of the tubular 32.

The wide diameter of the upset 48 of the outer sleeve 36 effectively prevents damaging contacts from encountering the threads at the pin end of the tubular 32. It also serves to protect the shoulder of the upset 34 of the tubular 32. The outer sleeve 36 effectively encloses or envelops the threads at the pin end of the tubular 32. This serves to protect the threads from damaging elements from the exterior environment. Since the outer sleeve 36 is freely rotatable with respect to the tubular 32, any contacts with the outer sleeve 36 will not be transmitted to the threads of the tubular 32. The outer sleeve 36 will simply rotate or swivel when rotational contact is applied. When the thread protector assemblies 30 of various tubulars would hit each other in a side-load configuration, such as when they are what loaded and rolled onto each other, the resulting torque is applied in the upset end 48 of the outer sleeve 36 and does not transmit torque to the threaded cap.

Figure 1:
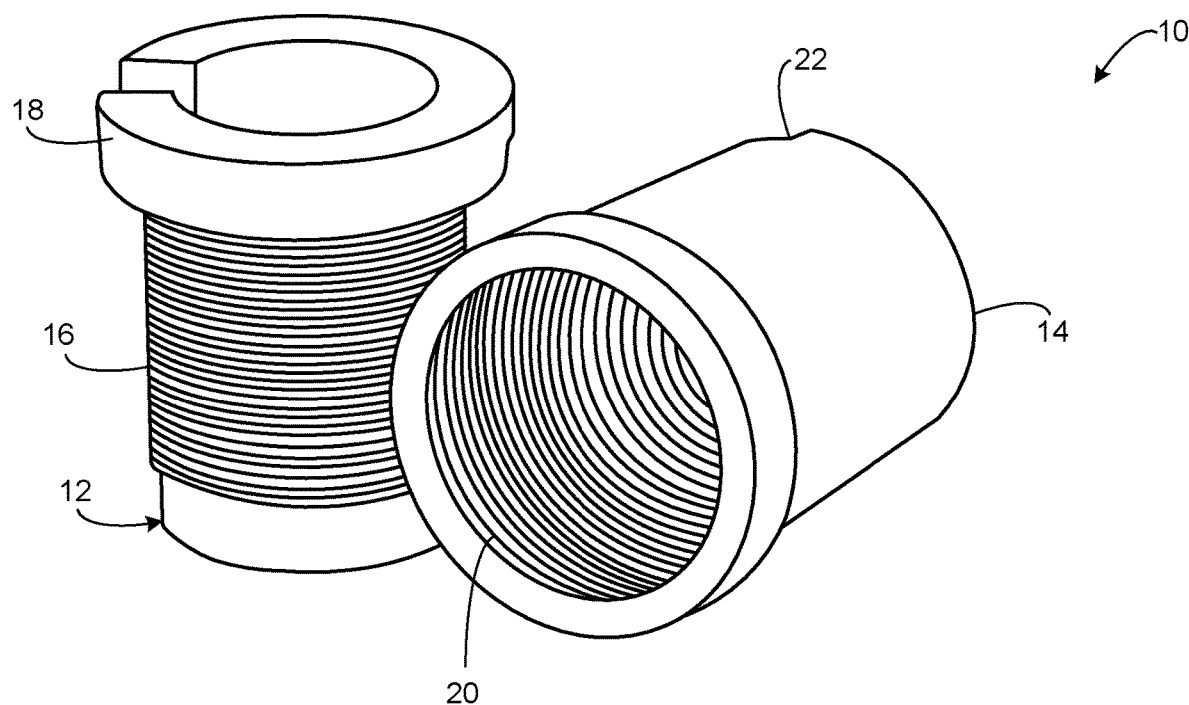
FIG. 1 shows a pair of standard thread protectors of the prior art.

As can be seen in FIG. 2, it is not necessary to rotate the outer sleeve 36 in order to unscrew the thread protector assembly 30. This is beneficial when multiple pipes are resting on top of each other. This creates a large dynamic side rotational load. This could make a conventional thread protector (such as those shown in FIG. 1) very hard to rotate. Instead, by the rotation of the cap 38, a pulling force is created. There is no turning force on the outer sleeve. As such, it is much easier to unscrew the thread protector assembly. The main advantage of the thread protector assembly 30 of the present invention is that when pipes hit each other, the swivel prevents torque from being transmitted to the cap. As such, the cap will retain the installation torque. This minimizes the chances of the thread protector assembly from unscrewing and falling off of the tubular 32.

Figure 3:
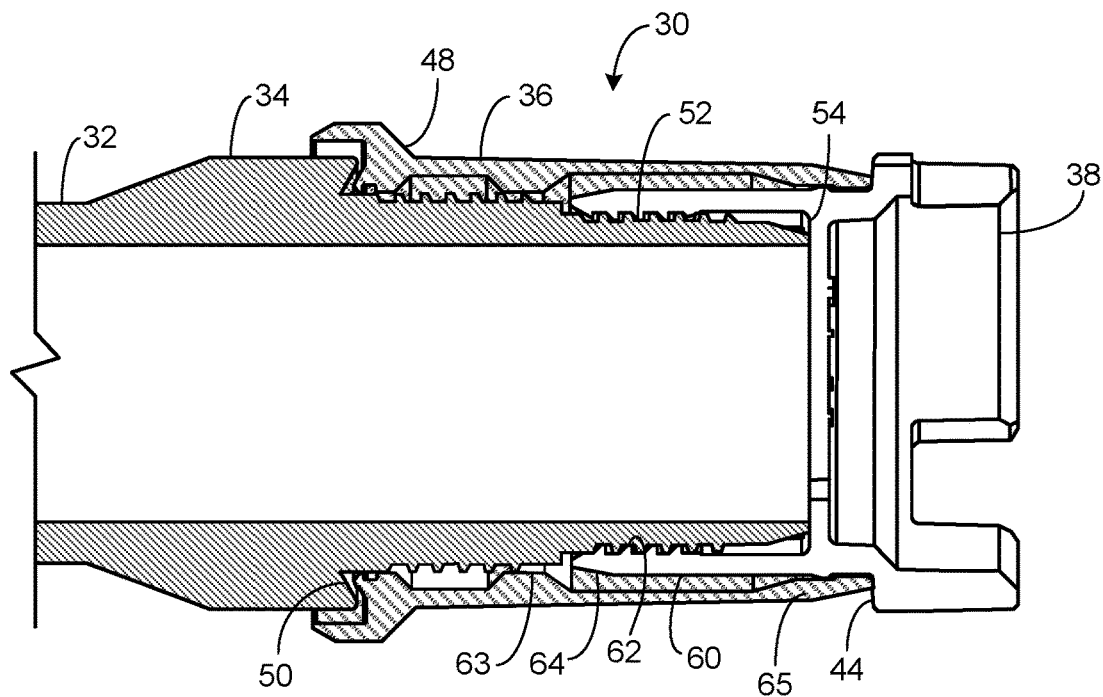
FIG. 3 is a cross-sectional view of the thread protector assembly of the preferred embodiment of the present invention.

FIG. 3 shows a cross-sectional view of the thread protector assembly 30. As can be seen in FIG. 3, the tubular 32 has a shoulder 50 formed at an end of the upset 34. The tubular 32 also has threaded surface 52 extending to the end 54. This configuration is in the nature of a standard pin end tubular.

The outer sleeve 36 overlies the threaded surface 52 of the tubular 32. The inner surfaces of the outer sleeve 36 are, in no way, directly contacting the threaded surface 52. The outer sleeve 36 has upset 48 formed at an end thereof. Upset 48 has an outer diameter greater than the outer diameter of the upset 34 of the tubular 32. The upset 48 has an internal surface that resides over and in proximity to the shoulder 50 of the tubular 32.

The outer sleeve 36 is positioned over the cap 38 in snap-fit relationship. In particular, there is an inward protrusion 63 that resides in proximity to a portion of the threaded surface 52 of the tubular 32. It also fits over the inner end of the cap 38. An end portion 65 of the outer sleeve 36 overlies an outer portion of the cap 38. As such, the outer sleeve 36 is properly retained in snap-fit relationship upon the cap 38 and over the threaded surface 52 of the tubular 32. In installation, the outer sleeve 36 is snap-fit onto the outer diameter of the cap 38. The cap 38 can then be screwed into the threaded surface 52 of the tubular 32 so that the outer sleeve overlies the threaded surface 52 of the tubular 32 in a freely rotatable and swivelable relationship.

Cap 38 is threadedly secured to the threaded surface 52 of the tubular 32. In particular, the cap 38 has a portion 60 that has internal threads 62 which engage the external threads at the end 54 of the tubular 32. As such, the cap 38 can be easily applied in a conventional manner by simply rotating the corresponding threads of the cap 38 and the threads of the tubular 32. The outer sleeve 36 overlies the outer diameter 64 of this portion 60 of the cap 38. Outer sleeve 36 has an end that is positioned adjacent to the shoulder 44 at the end 40 of cap 38.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A thread protector assembly comprising:
an outer sleeve; and
a cap having a portion positioned relative to said outer sleeve, the portion of said cap adapted to engage with a threaded surface of a tubular, said cap having an end exposed outwardly of said outer sleeve, said outer sleeve being freely rotatable or swivelable with respect to said cap, said sleeve having a wide diameter portion that has a diameter greater than a diameter of a remainder of said outer sleeve, the wide diameter portion of said outer sleeve being an upset formed at one end of said outer sleeve.

2. The thread protector assembly of claim 1, said outer sleeve having no surface directly engaged with the threaded surface of the tubular.

3. The thread protector assembly of claim 1, said end of said cap having a shoulder, the shoulder having an outer diameter greater than an outer diameter of said outer sleeve.

4. The thread protector assembly of claim 3, said outer sleeve having an end retained by the shoulder of the end of said cap.

5. The thread protector assembly of claim 1, the end of said cap having a slot formed therein, the slot adapted to allow a tool to be received therein for rotation of said cap with respect to the tubular.

6. The thread protector assembly of claim 1, the portion of said cap having internal threads formed therein, the portion of said cap being positioned interior of said outer sleeve, the internal threads adapted to engage with the threads of the tubular.

7. An assembly comprising:
   a tubular having threads at one end thereof, said tubular having a shoulder formed away from the one end;
   a cap having a portion engaged with the threads of said tubular, said cap having an end extending outwardly beyond the one end of said tubular; and
   an outer sleeve being retained by said cap such that said outer sleeve is freely rotatable or swivelable relative to said cap, wherein said outer sleeve is retained in snap-fit relationship upon a surface of said cap.

8. The assembly of claim 7, said outer sleeve having a wide diameter portion that has a diameter greater than a diameter of a remainder of said outer sleeve.

9. The assembly of claim 7, said outer sleeve having no surface directly engaged with the threads of said tubular.

10. The assembly of claim 7, said end of said cap having a shoulder, the shoulder having an outer diameter greater than an outer diameter of said outer sleeve.

11. The assembly of claim 7, wherein the portion of said cap is positioned interior of said outer sleeve.

12. The assembly of claim 7, the end of said cap having a slot formed therein, the slot adapted to allow a tool to be received therein for rotation of said cap with respect to said tubular.

13. The assembly of claim 7, the portion of said cap having internal threads formed therein, the internal threads engaging with external threads of the tubular.

14. The assembly of claim 7, the one end of said tubular being a pin end, the portion of said cap having internal threads threadedly engaged with the threads of the pin end, said outer sleeve having a length greater than the portion of said cap.

15. An assembly comprising:
   a tubular having threads at one end thereof, said tubular having a shoulder formed away from the one end;
   a cap having a portion engaged with the threads of said tubular, said cap having an end extending outwardly beyond the one end of said tubular; and
   an outer sleeve being retained by said cap such that said outer sleeve is freely rotatable or swivelable relative to said cap, said outer sleeve having a wide diameter portion that has a diameter greater than a diameter of a remainder of said outer sleeve, the wide diameter portion of said outer sleeve being an upset formed at one end of said outer sleeve.

16. The assembly of claim 15, the upset of said outer sleeve overlying an outermost portion of the shoulder of said tubular.

17. The assembly of claim 16, the upset having an outer diameter greater than an outer diameter of a widest diameter of said tubular.

* * * * *